(12) United States Patent
Royall, Jr. et al.

(10) Patent No.: US 8,036,992 B2
(45) Date of Patent: Oct. 11, 2011

(54) METHODS OF GENERATING APPLICATIONS FOR ENROLLMENT AT EDUCATIONAL INSTITUTIONS

(75) Inventors: William A. Royall, Jr., Richmond, VA (US); Edward B. Freeman, III, Richmond, VA (US); Elizabeth W. Clark, Richmond, VA (US)

(73) Assignee: Royall & Company, Richmond, VA (US)

( * ) Notice: Subject to any disclaimer, the term of this patent is extended or adjusted under 35 U.S.C. 154(b) by 1071 days.

(21) Appl. No.: 10/428,097

(22) Filed: May 2, 2003

(65) Prior Publication Data

US 2004/0015388 A1 Jan. 22, 2004

Related U.S. Application Data

(62) Division of application No. 09/633,897, filed on Aug. 7, 2000, now abandoned.

(60) Provisional application No. 60/205,558, filed on May 22, 2000, provisional application No. 60/147,366, filed on Aug. 5, 1999.

(51) Int. Cl.
*G06Q 50/00* (2006.01)
(52) U.S. Cl. ........................................ 705/327; 705/326
(58) Field of Classification Search ................ 705/1
See application file for complete search history.

(56) References Cited

U.S. PATENT DOCUMENTS

| 5,878,403 | A | 3/1999 | DeFrancesco et al. |
| 5,930,764 | A | 7/1999 | Melchione et al. |
| 5,966,695 | A | 10/1999 | Melchione et al. |
| 6,460,042 | B1 * | 10/2002 | Hitchcock et al. .............. 707/10 |
| 2001/0031458 | A1 | 10/2001 | Schramm |
| 2001/0049692 | A1 | 12/2001 | Callaghan et al. |
| 2002/0040301 | A1 | 4/2002 | Royall et al. |

FOREIGN PATENT DOCUMENTS

WO WO 9849641 11/1998

OTHER PUBLICATIONS www.noellevitz.com, Newsletter archive, "Grading and qualifying prospects," Winter 1998 (part 1) and Spring 1998 (part 2).*

(Continued)

*Primary Examiner* — Traci Casler
(74) *Attorney, Agent, or Firm* — Duane Morris, LLP

(57) ABSTRACT

A method of increasing the number of applications for enrollment at an institution of higher learning, including the initial profiling of the institution's candidate inquiry pool against the institution's enrollment objectives, the electronic solicitation of additional information and the reiterative profiling of candidates during the period before an application is sent to determine the candidate's continued interest, the customization of interest piquing communications with the candidates and the application itself, the offering of choices as to the method of completing the application and incentives to do so, and the evaluation of the program from the monitoring of the application responses.

13 Claims, 5 Drawing Sheets

OTHER PUBLICATIONS

Kuras, Janet, "College recruitment that counts," Fund Raising Management, v28n7, pp. 22-23, Sep. 1997.* www.lamtech.com, Retrieved from Internet Archive Wayback Machine <www.archive.org>, Date Range: May 1998-May 1999.* www.collegeedge.com.

www.collegenet.com.

"CollegeEdge, The Leading Provider of Web-based Services to Education al Institutions, Announces Success of Enrollment Services System," Business Wire, Mar. 1, 1999.

"CollegeEdge Pushes Ahead on all Fronts; Market Leader Announces record Online College Admissions; and New Product Enhancements, Customers and Partners," Business Wire, Mar. 1, 1999.

"CollegeEdge Goes Live on Netscape Netcenter for the Back-to-School Season," Business Wire, Sep. 22, 1998.

"New Colleague Integration Increases Productivity for College and University Admission Officers," PR Newswire, p. 2203, Dec. 7, 1998.

McDermott, Irene E., "Joining the Ivy League: College Resources on the Web," Searcher, Feb. 1999.

"CollegeEdge and U.S. News & World Report Partner to Help College-Bound Students get Recruited and Apply to Schools Online," Business Wire, Mar. 1, 1999.

"SNAP Technologies, Inc., The Makers of CollegeEdge, Changes Name to Embark.com," PR Newswire, Aug. 4, 1999.

"Universal Algorithms: On-line Applications now on CollegeNET," Business Wire, Sep. 20, 1995.

"CollegeNET: CollegeNET Introduces World's First Web-Based Marketing System for College-Bound Students," Business Wire, Oct. 28, 1997.

Anonymous, "Universal Algorithms, Inc. enhances CollegeNET: College Applications can now be Submitted and Processed Worldwide via the Internet," ProQuest Info&Learning, Jul./Aug. 1996.

"CollegeNET: CollegeNET Unveils "CollegeBOT"—The World's First Concentrated College Crawler," Business Wire, Aug. 12, 1998.

* cited by examiner

METHODS OF GENERATING APPLICATIONS FOR ENROLLMENT AT EDUCATIONAL INSTITUTIONS

RELATED APPLICATIONS

This is a continuing divisional application of and claims priority from co-pending U.S. non provisional patent allocation Ser. No. 09/633,897 filed Aug. 7, 2000, now abandoned which in turn claims priority from U.S. provisional patent application Ser. No. 60/147,366 filed Aug. 5, 1999, as well as from U.S. provisional patent application Ser. No. 60/205,558 filed May 22, 2000.

BACKGROUND OF THE INVENTION

Educational institutions have student recruitment goals that are imposed by a number of factors internal and external to the institution. Some of these factors may be related to diversity of race, ethnicity, gender, geographic location of student candidate (which may be based on one or more digits of the student candidate's home ZIP Code), sports ability, scholastic ability, etc. Each educational institution has a unique set of criteria to be met in order to attract the type of student that will allow the institution to meet its particular goals.

Traditionally, educational institutions have relied on various isolated shotgun techniques to attract students. Some of these techniques are mailing a blank application to any student candidate who expressed even the slightest interest in attending the educational institution and using an automatic phone dialing service to ascertain a student candidate's level of interest in attending the educational institution. These methods are expensive and limited in their ability to fulfill the educational institution's recruitment goals.

The present invention relates to college and university student recruitment and is directed towards increasing applications for admission as well as achieving the educational institution's recruitment goals.

A college or university receives inquiries from prospective student candidates expressing an interest in attending the college. These inquiries can be received, for example, as early as the candidate's freshman year in high school and in some instances even earlier. These inquiries come from various sources such as correspondence, e-mail, telephone, contact with a recruiter, or the receipt of PSAT or SAT scores from a student.

Depending on the source of the inquiry, various information about the candidate may be provided, e.g., the candidate's high school class, age, contact information, gender, race, ethnicity, relationships with alumni, scholastic and sports interests, etc. All of the available information, from whatever source, is typically entered into a database of candidates, often called an "inquiry pool". This information is used by the institution to determine both the suitability of the candidate from the institution's perspective and the genuineness of the candidate's interest. The number of candidates in an inquiry pool may be 100,000 or more.

Since institutions typically defer sending an application to a candidate until the fall of the candidate's senior year in high school, candidates may remain in the institution's inquiry pool for several years. A continuing problem is the qualification of the candidate against the enrollment objectives of the institution since both the selection criteria of the institution and the qualifications of the candidate vary over time. Telephone polling services are often used in order to qualify the interest of candidates in a particular institution. However, such attempts to qualify the candidates are often time consuming, i.e., it may take the telephone polling service up to two months to call each candidate in an inquiry pool, and the expense can be quite significant, often more than two dollars per candidate. Thus, it is highly desirable to qualify the candidates in the inquiry pool in a more cost-effective manner so as to eliminate unqualified candidates and those candidates whose interest may not be genuine, thereby reducing the expense of contacting them and the delay in contacting qualified and genuinely interested candidates.

Another problem is that of maintaining the interest of the candidates in the inquiry pool until such time as the applications are sent out to the student candidates. Universities today are highly competitive and strive to maintain the interest of qualified candidates in this often prolonged period through repeated contact with the candidate. Such contact may include the mailing of brochures or other information on various aspects of the institution, or hosting receptions, college fairs, open houses, or campus visits for prospective student candidates. These various forms of contact give rise to the costs of selecting appropriate materials, mailing a broad spectrum of materials, and incurring professional staff travel expenses.

Another problem is created by the generic nature of the typical application and its accompanying materials, as the material and the application itself is usually prepared in the typical "one size fits all" approach. This lack of personalization for the interest of the candidate increases the expense and typically reduces the interest of the candidate.

Accordingly, it is an object of the present invention to obviate many of the above problems associated with the generally known methods of soliciting applications for enrollment and to provide novel methods for qualifying applicants for enrollment at an institution of higher learning.

In accordance with the teachings of the present invention, a method of evaluating the interest of enrollment candidates which drastically reduces both the cost of ascertaining the interest of the candidates and the time needed to complete the evaluation of the candidates.

It is another object of the present invention to provide a novel method of evaluating the enrollment interest of candidates based on the information initially provided by the candidate.

It is a further object of the present invention to provide a novel method of economically evaluating from time to time the continued enrollment interest of candidates.

It is yet another object of the present invention to provide a novel method of motivating candidates to provide information relating to their continued interest in enrollment.

It is a yet a further object of the present invention to provide a novel method of generating and delivering an application for enrollment at an institution of higher learning.

It is yet still a further object of the present invention to provide a novel method of increasing the number of applications received by an institution from its inquiry pool, and for evaluating the application solicitation program.

It is a further object of the present invention to provide a novel method of electronically evaluating and maintaining the interest of the candidates in an institution's inquiry pool and providing the option of electronic application.

These and many other objects and advantages of the present invention will be readily apparent to one skilled in the art to which the invention pertains from a perusal of the claims, the appended drawings, and the following detailed description of the preferred embodiments.

DESCRIPTION OF PREFERRED EMBODIMENTS

One embodiment of the present invention uses specific business methodologies to assist an educational institution in achieving the institution's student recruitment goals based on the criteria set by the institution. The inventive method builds on some of the traditional techniques used by educational institutions to attract students as well as introduces new processes to the student recruitment problem.

Each individual educational institution has a unique student recruitment goal as well as a unique set of criteria for attaining their student recruitment goal. For example, one educational institution may want to become more ethnically diverse while another may want to recruit more women interested in sports. The student recruitment goals and the set of criteria to be use to achieve those goals for each individual educational institution vary widely. Consequently, there is a need for a systematic approach with sufficient flexibility to accommodate these diverse requirements.

One aspect of the present invention uses a profiling procedure which is designed to qualitatively measure each educational institution's pre-existing inquiry pool. This allows for the examination of the characteristics of the student candidates in the inquiry pool. After the characteristics are examined, the student candidates in the inquiry pool can be segmented into subgroups according to shared characteristics. Based on the characteristics of the subgroups as compared with the selection criteria supplied by the educational institution, these subgroups can be selected for targeting by mail, e-mail, telephone call, or other means of communication.

Figure 1:
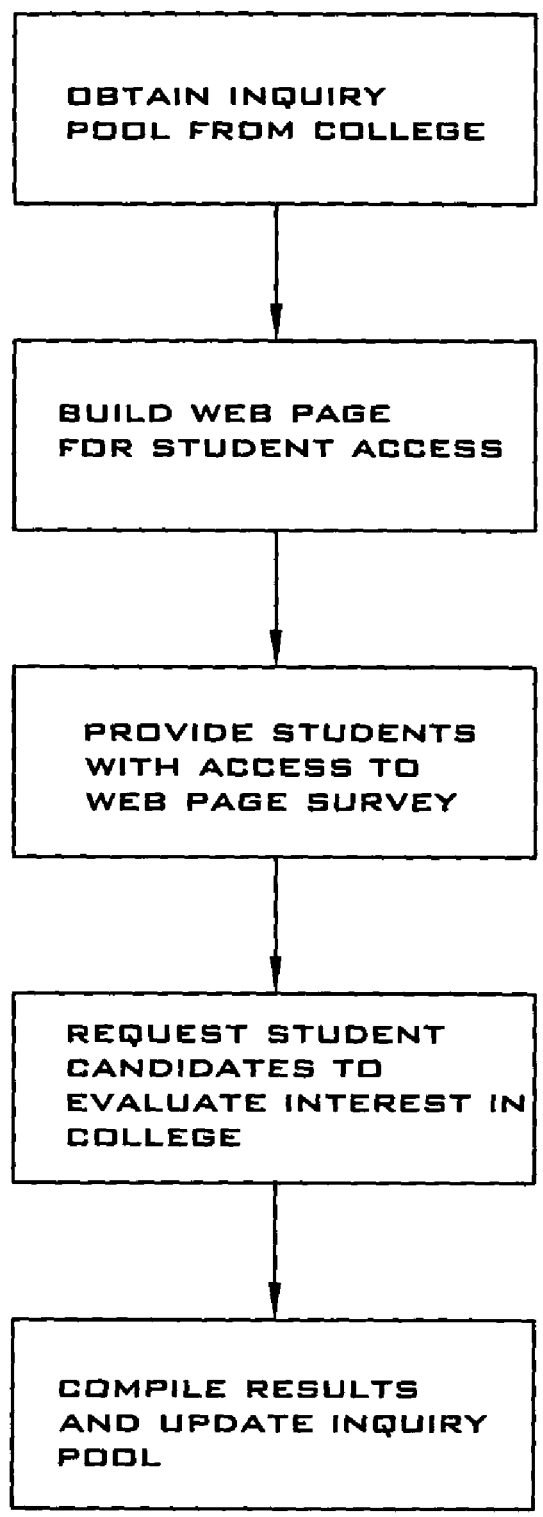
FIG. 1 is a diagramatic flow chart illustrating one method of qualifying the candidates in an inquiry pool and for evaluating their enrollment interest.

With reference to the flow chart of FIG. 1, the initial step, Block 10, in the present invention is to obtain the college's inquiry pool. As indicated above, the information in the inquiry pool may be derived from many sources and may vary significantly in content for the candidates identified there. The inquiry pool is generally embodied in a conventional data base accessible from any suitable conventional input/output device and transported from the institution to a remote location for processing by recording on a suitable conventional recording medium or electronically over a hard wired or radio communications link such as a LAN, WAN, the internet or millimeter wave or microwave radio communications channel.

The inquiry pool may, in Block 11, then be profiled in a conventional manner against the criteria selected by the university. For example, the criteria may include the candidate's high school class year, any prior visits of the candidate to the university and the source of the candidates initial contact with the university. Other criteria such as the candidate's gender, ethnicity, age, place of residence, relationships with alumni of the university, geographic area, etc. may be considered to the extent that they are available in the data base. Certain of these criteria may be ignored for purpose of this initial profiling. Alternatively, each of the selected criteria may be weighted in a conventional manner to provide a measure of the desirability of the candidate to the university.

Once the profiling has been electronically accomplished, a report of the evaluation may be provided to the institution in hard copy and/or in electronic form, as indicated in Block 12.

An additional step may be taken, as in Block 13, to prepare a mailing list of those candidates, as a result of the profiling, that meet the criteria set forth by the university. The mailing list may include both mailing addresses and e-mail addresses as well as other means of contacting the candidates such as telephone numbers, facsimile numbers, or contact with a parent or through a high school or other guidance counselor. It is to be understood that the term "mailing" encompasses any and all forms of communication between the university and the candidate.

Once the mailing list is prepared, documentation is selected for mailing to the candidate, as indicated in Block 14. The documentation is selected on the basis of a number of factors that are preferably associated with the criteria selected by the university as well as the method chosen for communicating with each specific candidate. Once the documentation is selected, the documentation may be mailed to the candidates, as indicated in Block 15.

Figure 2:
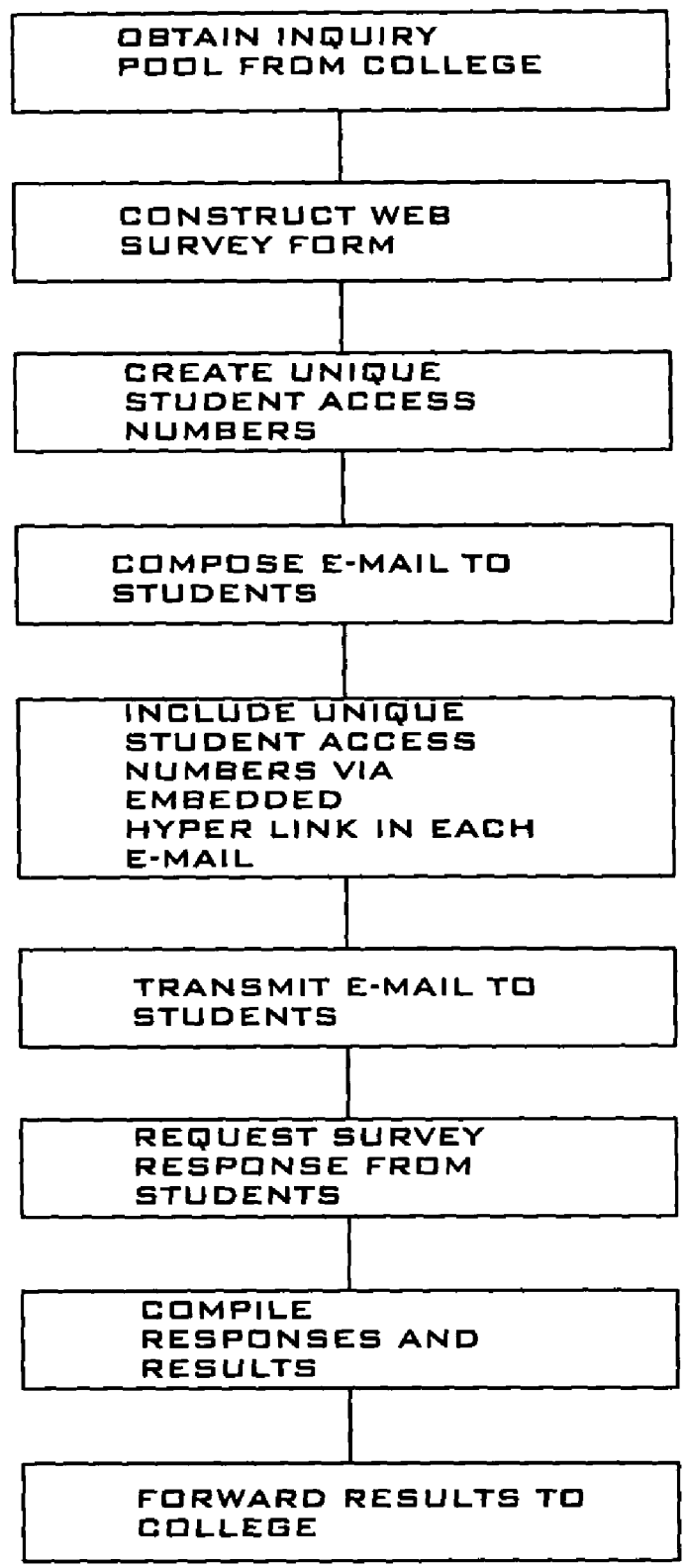
FIG. 2 is a diagramatic flow chart illustrating one method of evaluating the interest of candidates for enrollment.

In one embodiment of the present invention as shown in the flow chart of FIG. 2, a web site may be created and used to electronically survey candidates. A web site may be created for each individual educational institution or one web site may be created that is then segmented so that information pertaining to a particular educational institution is contained within one particular area of the web site. For instance, each particular educational institution may have its own web page in the overall web site. In either case, the inquiry pool and the information for updating the inquiry pool of one educational institution will not be commingled with the inquiry pool and the information for updating the inquiry pool of a second educational institution. This is necessary since the set of student candidates in the inquiry pools of each educational institution will be different.

With reference to FIG. 2, Block 20, the inquiry pool is first obtained from the educational institution as discussed above. As indicated in Block 21, a web page in the web site of the institution may then be constructed for student candidate access. The web page may be constructed in a manner well known in the art. The web page may include an electronic survey form. Student candidates can be given electronic access to the web page and an electronic survey form, as indicated in Block 22.

On the web page, an electronic survey form can be used to evaluate the interest of student candidates in attending the particular educational institution for which the web page applies, as indicated in Block 23.

As indicated in Block 24, the results obtained may be compiled and used to update the information in the inquiry pool of the educational institution associated with the particular web page. The compilation of results can occur as frequently as required by the educational institution and/or may occur after some triggering event, such as a set time period prior to a deadline for mailing applications to student candidates, for example.

Figure 3:
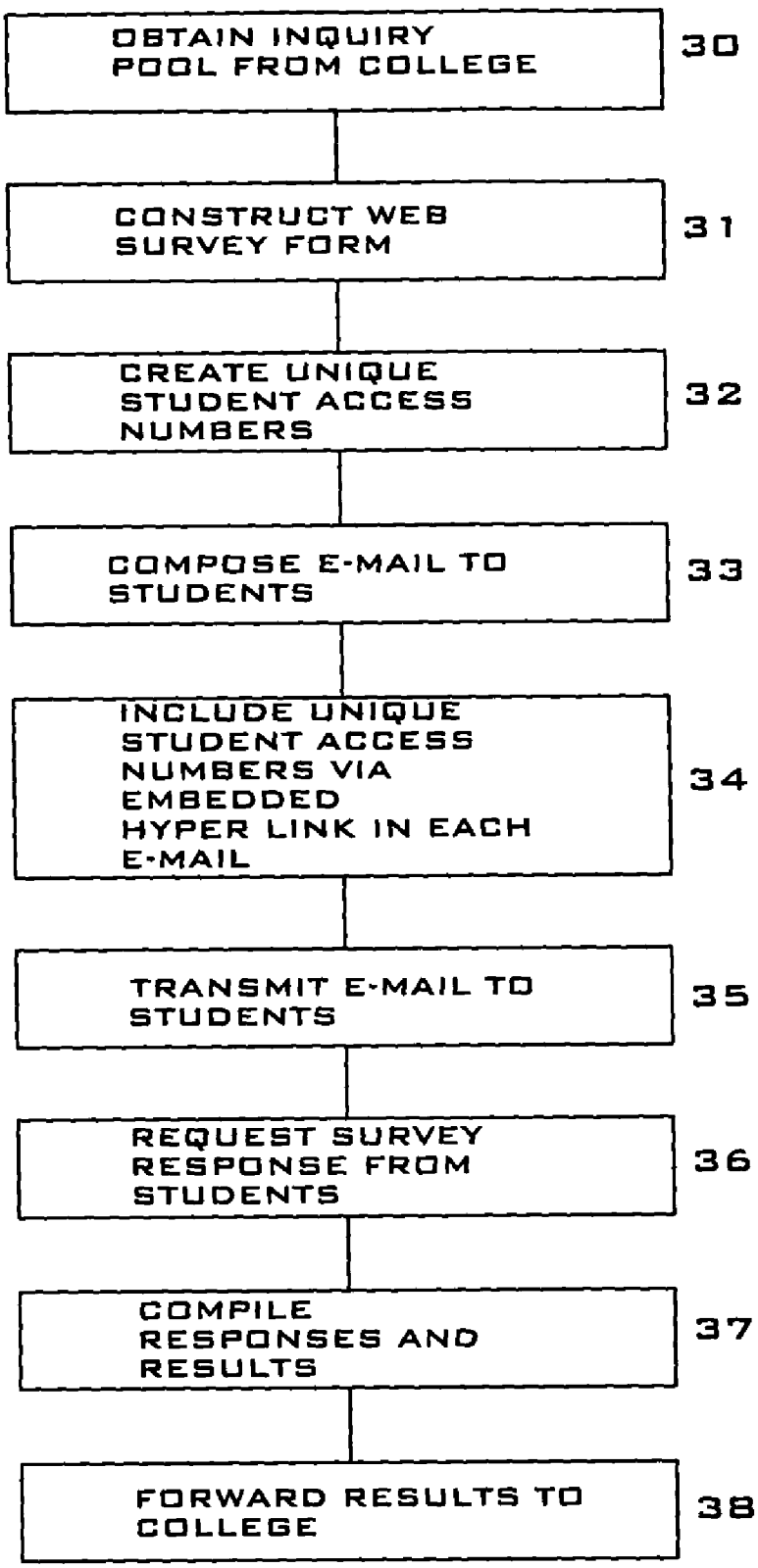
FIG. 3 is a diagramatic flow chart illustrating one method of electronically surveying candidates for enrollment.

FIG. 3 is a flow chart with a more detailed embodiment of the invention as it relates to evaluating the continued interest of student candidates in submitting an application to attend a particular educational institution. Evaluating the continued interest of student candidates in attending the particular educational institution is an important step in determining to whom applications should be sent in order to reduce the costs associated with meeting the educational institution's enrollment goals. Block 30 represents the first step in this particular embodiment, which is obtaining an educational institution's inquiry pool.

As indicated in Block 31, a web survey form is created for use in a web site which will be accessed by prospective student candidates. The web survey form is designed to determine student candidates' interest in applying to the particular educational institution. The web survey form also includes a section that allows the student candidate to complete and/or update his/her personal information, such as full name, preferred name, address, phone number, ZIP Code, academic interest, etc. Additionally, the web survey form may include other factors to help the educational institution evaluate the interest level of the student candidate. These factors may be answered in such a way that the educational institution can rank the importance of each factor to the student candidate over a predetermined spectrum of responses. As an example, the student candidate can indicate the importance of each individual factor as: "Not important at all"; "Not very important"; "Somewhat unimportant"; "Neutral"; "Somewhat important"; "Important"; or "Very important". Other response spectra, with more or less choices, are also contemplated. An example of factors for the student candidate to evaluate are: "Campus safe and secure"; "You [the educational institution] offer majors that interest me"; "You [the educational institution] have an athletics program that fits my needs"; "Extracurricular activities that I enjoy are readily available"; "Admission staff is accessible"; "Faculty care about students as individuals"; "[educational institution] prepares me for a career that interests me"; "The school location is desirable and meets my needs", etc.

As indicated in Block 32, a unique access number is created for each student candidate so that each candidate can only access his/her own personal information. Additionally, the access numbers are randomly, not sequentially, assigned and are of sufficient length that the chances of unauthorized access to a student candidate's information is minimized.

The next steps in the process of this embodiment, as indicated in Blocks 33-36, is to compose an e-mail to the student candidates, such that a response to the survey will be elicited from the student candidate. For example, any personal information known about the student candidate, such as his/her name, major preference, or sporting activity preference, will be included in the e-mail. Embedded in each e-mail is the unique student candidate access number for that particular student candidate. The unique student access number is embedded in a hyperlink in the e-mail in ways known in the art. The e-mails are then transmitted to the student candidates.

As indicated in Blocks 37-38, the responses from the web survey can be compiled and the results of the survey forwarded to the educational institution. As discussed above, the compilation of the web survey responses can occur at any predetermined frequency or upon at the time of any triggering event. The compilation can also happen at random intervals. The compilation may occur either automatically or upon specific command.

Figure 4A:
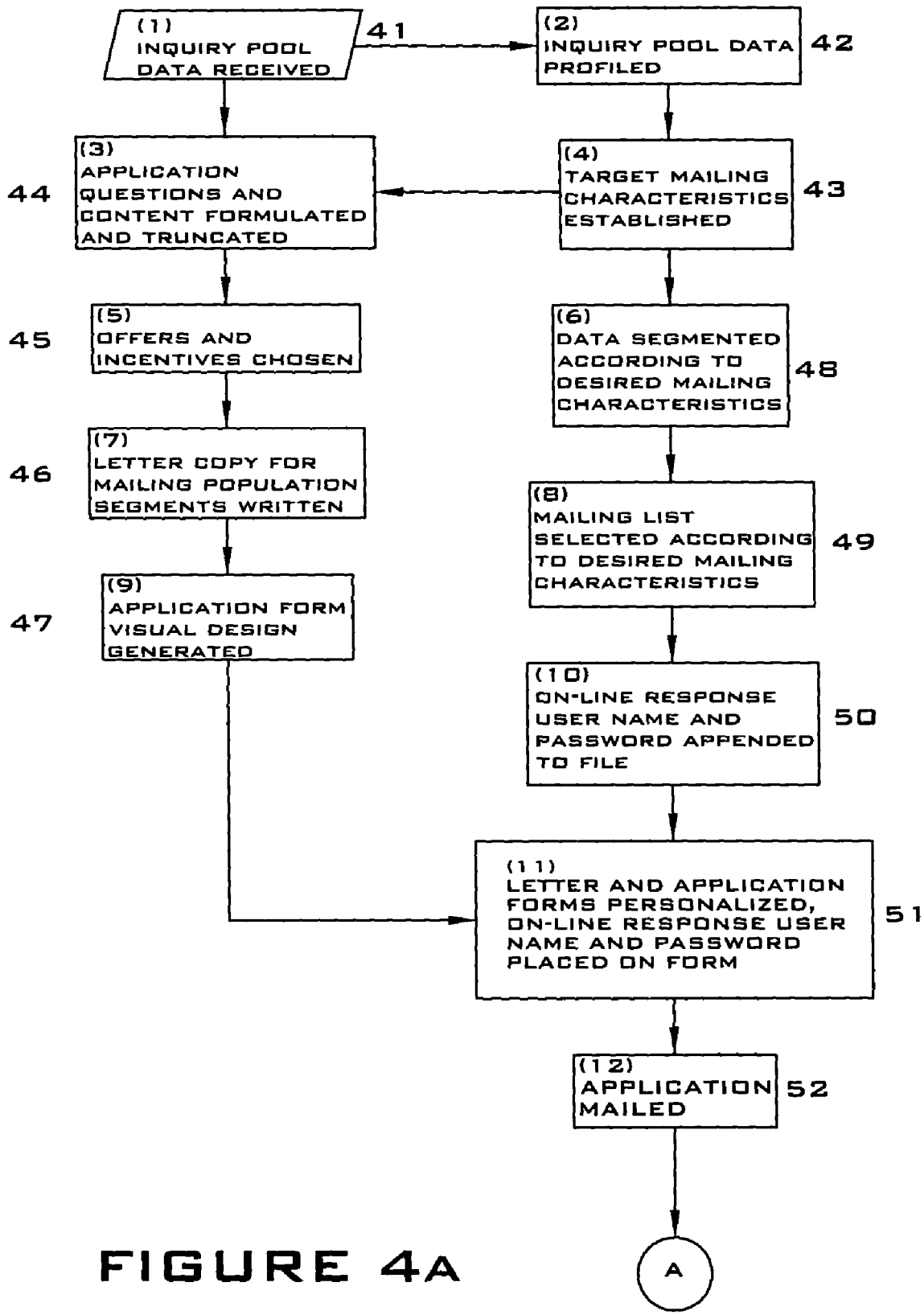
FIGS. 4(A) and 4(B) are a diagramatic flow chart illustrating one method of increasing applications for enrollment.
Figure 4B:
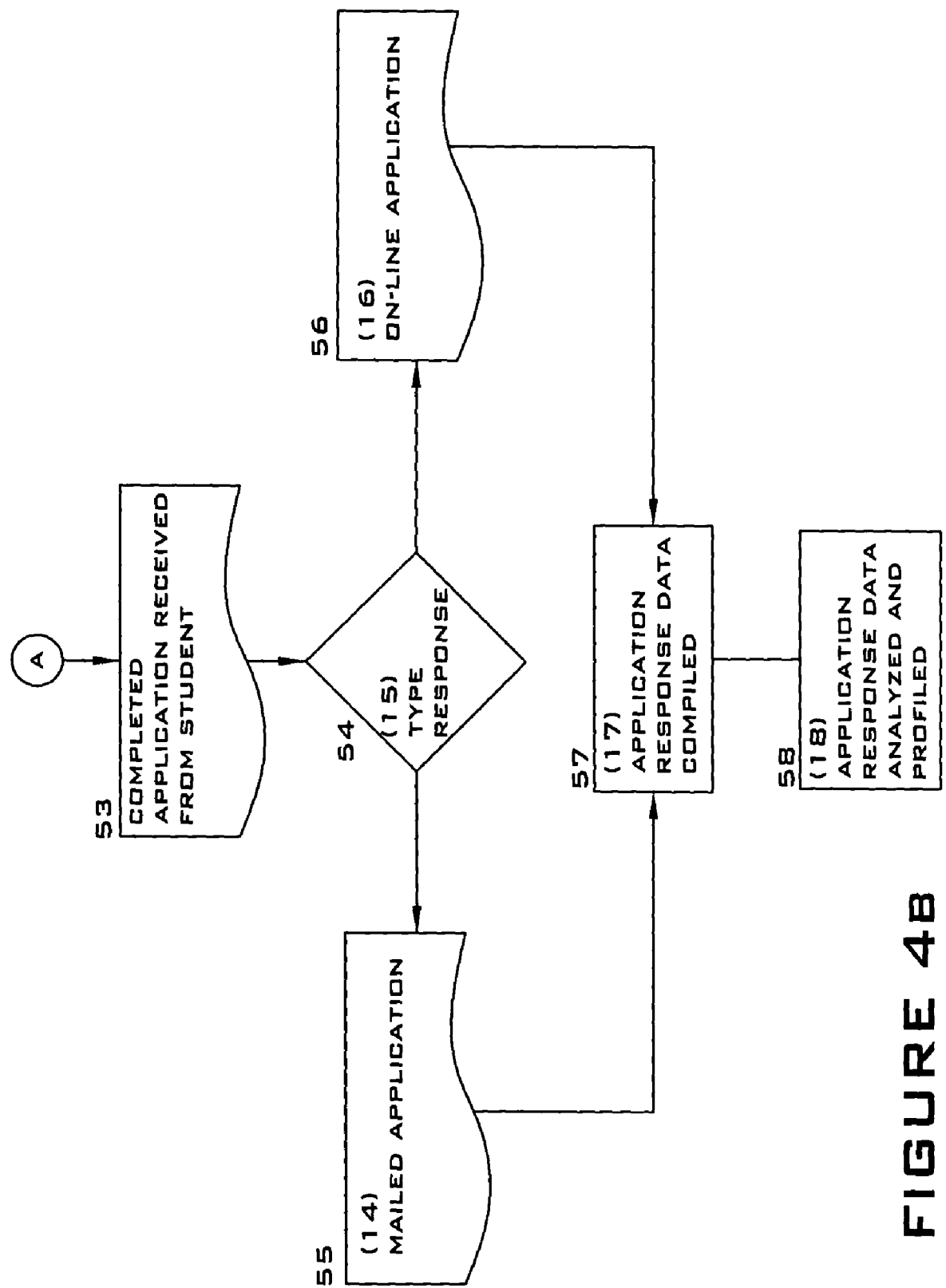

With reference to FIGS. 4(A) and 4(B), one method for increasing applications for enrollment begins with the step, Block 41, of obtaining the inquiry pool from the educational institution as discussed above. The student candidates in the inquiry pool may, in Block 42, then be profiled in accordance with the criteria selected by the educational institution as the institution's target mailing characteristics, Block 43. Based upon the established characteristics, the application package may be customized and personalized to appeal to the particular student candidates in the targeted mailing segment, as described below. As shown in Blocks 44-47, the application package may be customized by: filling in certain questions which are already known to the institution from the candidate data contained in the inquiry pool, such as name, address, intended major, extracurricular activities, etc.; truncating and simplifying the questions in the application; formulating the content of the application to appeal to the targeted mailing segment; determining and offering incentives for timely completion and submission of the application; and designing and generating the graphical theme of the letter, package, application, and other material in the application package.

It is important to note that both paper and electronic application packages are contemplated by the inventive method. The inventive method expands on the prospective student's choices of how to respond: there is the traditional method of response where the student candidate completes an application received by mail and returns the application to the educational institution by mail. The inventive method has added another response option—the online application. In the personalized letter that accompanies each mailed application, the student is assigned a personal identification number (or "PIN") and directed to a website that they can access if they wish to complete the application for admission electronically. When the student enters the website and logs on with the assigned PIN, the prospect's demographic information from the inquiry pool data file is loaded onto the online application—just like the partially filled-out application that they received in the mail. The student can now either (1) fill out the application which they received in the mail; (2) complete the application online and submit it to the school electronically; or (3) fill out the application online, print it out to proof read, and then mail the application back to the school. These enhanced response options provided by the inventive method add to the distinctiveness of the entire business process, and further enhance the chances of a desired response.

In Blocks 48 and 49, the inquiry pool is segmented and a mailing list is created for the target mailing segment, as described above. This segment of the data base is appended with the particular student candidate's user name and password from the web survey form, as indicated in Block 50.

As indicated in Block 51, the letter and application forms are personalized with known information about the particular student candidate to whom the application package will be sent. Once the personalized application package is prepared, the application package is sent to the particular student candidate for which that application is personalized, as indicated in Block 52.

In Blocks 53-58, once the student candidates complete and send in their personalized applications, the application response data is compiled, analyzed, and profiled. The profiling process is similar to the profiling process previously described.

ADVANTAGES AND SCOPE OF THE INVENTION

The methods of the present invention are of great assistance to educational institutions in meeting their student recruitment goals by dramatically improving both the number and quality of applications for enrollment received by a college or university when compared to traditional techniques currently in use, while reducing the costs associated with maintaining an inquiry pool of prospective candidates and providing a unique method for evaluating the continued interest of those candidates over time.

The list profiling procedure of the present invention qualitatively measures each institution's list of prospective students in its inquiry pool and allows an advance look into the candidate population to whom the institution intends to mail. This advance look examines all of the characteristics of each candidate, permits the segmentation of the inquiry pool into subpopulations of candidates with common characteristics elected by the university in accordance with its enrollment goals, and permits the selection of groups of candidates with whom to communicate as a function of the specific goals for student recruitment set by the university.

By use of the profiling mechanism of the present invention, the candidates in which the institution has the greatest interest in, and the candidates in which the institution will derive the greatest benefit from admitting may be identified.

In addition to identifying candidates, the profiling mechanism of the present invention provides valuable information as to both the substantive content of the communications and the manner in which the of information is presented at all phases of the process. This personalization of the communications, e.g., personalization of the letters for each identified demographic group or subset of the institution's mailing population, has proven a valuable tool in stimulating the continued interest of the candidates over time.

The information obtained about each candidate is also desirably used to personalize each application with the candidate's name, address and other demographic information, thus converting an application for admission into a personal invitation for the candidate. The application itself may be truncated because information known to the institution about the candidate through the inquiry pool profiling procedure need not be again requested in the application, and research has shown that candidates are far more likely to complete a shorter, personalized application than a longer, standardized form. This results in a significantly increased application response rate.

Another important advantage of the present invention is the ability to motivate the candidates to respond. Because of the information available through profiling, it becomes possible to include an incentives to the candidate to complete the application for admission and return it to the institution. Incentives such as the promise of an immediate application decision, a waiver or reduction of the usual application fee, a waiver or reduction of the descriptive written essays which are usually required, or even priority merit scholarship consideration or priority housing preference consideration have been found to have material impact on the application completion rate.

Still another important aspect of the present invention is the expansion of the candidate's choices in selecting the method of completing and submitting the application. In addition to the traditional method where the student completes an application received by mail and returns it to the college or university by mail, candidates may complete an online application for printing and subsequent mailing to the institution or for electronic submission. The personalization earlier discussed is a significant aspect, e.g., the candidate may be provided with a personal identification number or PIN in the personalized letter that accompanies each mailed application, and may be directed to a website where logging on with the PIN materially prefills the application with the candidate's personal information.

A further advantage of the use of the methods of the present invention is the subsequent analysis of the application program itself. The monitoring of the receipt and quality of completed applications received provides important feedback to the university and a thorough documentation of the program's success in relation to its stated objectives.

While preferred embodiments of the present invention have been described, it is to be understood that the embodiments described are illustrative only and that the scope of the invention is to be defined solely by the appended claims when accorded a full range of equivalence, many variations and modifications naturally occurring to those of skill in the art from a perusal hereof.

What is claimed is:

1. A method for generating an application for candidates to enroll at an institution of higher learning comprising the steps of:
   (a) providing a data base including information related to candidates for enrollment, the preferences of the institution for students with predetermined characteristics, and a standard application for admission to the institution;
   (b) electronically evaluating the candidates in the data base against a first predetermined profile including the preferences of the institution to thereby select candidates for receiving an application;
   (c) truncating the standard application in the data base as a function of the identity of each of the selected candidates; and
   (d) forwarding the truncated applications to the selected candidates.

2. The method of claim 1 including the further step of:
   (e) Printing the truncated application; and
   wherein the printed application is forwarded to the applicants by mail.

3. The method of claim 2 including the steps of notifying the candidate of (1) a PIN, (2) the institution's web site and (3) the availability of an electronic application on the institution's web site.

4. The method of claim 1 wherein the truncated application is forwarded to the applicants by electronic mail.

5. The method of claim 1 including the further step of offering an incentive to complete the application at the time the application is forwarded.

6. The method of claim 5 wherein the incentive includes at least one of (1) priority of the decision as to admission, (2) priority of scholarship consideration, and (3) reduction of the application fee.

7. The method of claim 6 wherein the incentive includes at least two of (1) priority of the decision as to admission, (2) priority of scholarship consideration, (3) waiver or reduction of the application fee, (4) waiver or reduction in the personal essay requirements, and (5) priority of housing preference consideration.

8. A method for generating an application for candidates to enroll at an institution higher learning comprising the steps of:
   (a) providing a data base including information related to candidates for enrollment, the preferences of the institution for students with predetermined characteristics, and a standard application for admission to the institution;
   (b) electronically evaluating the candidates in the data base against a first predetermined profile including the preferences of the institution to thereby select candidates for receiving an application;
   (c) truncating the standard application to omit questions, answers to which are contained in the data base, the truncating being a function of the identity of each of the selected candidates; and
   (d) forwarding the truncated applications to the selected candidates.

9. The method of claim 8 wherein the step of truncation includes the further step of offering an incentive for completion of the application.

10. The method of claim 9 wherein the incentive includes at least two of (1) priority of the decision as to admission, (2) priority of scholarship consideration, (3) waiver or reduction of the application fee, (4) waiver or reduction in the personal essay requirements, and (5) priority of housing preference consideration.

11. The method for generating an application for candidates to enroll at an institution of higher learning comprising the steps of:
   (a) providing a data base including information related to candidates for enrollment, the preferences of the institution for students with predetermined characteristics, and a standard application for admission to the institution;
   (b) electronically evaluation the candidates in the data base against a first predetermined profile including the preferences of the institution to thereby select candidates for receiving an application;
   (c) providing a web page on the institution's web site with the standard application resident thereon;
   (d) sending e-mail directing the candidate to the institution's web page;
   (e) identifying the candidate at the time he logs on to the web page;
   (f) truncating the standard application as a function of the identity of the identified candidate; and
   (g) remotely completing the truncated application on the web page.

12. The method of claim 11 wherein the e-mail which directs the candidate to the web page provides a PIN for the candidate; and
   wherein use of the PIN by the candidate at log on truncates the application.

13. The method of claim 12 wherein the step of truncating includes the steps of:
   omission of questions answers to which are contained in the data base.

* * * * *